United States Patent
Takaki

(10) Patent No.: US 9,873,379 B2
(45) Date of Patent: Jan. 23, 2018

(54) COMPOSITE IMAGE GENERATION APPARATUS AND COMPOSITE IMAGE GENERATION PROGRAM

(71) Applicant: DENSO CORPORATION, Kariya, Aichi-pref. (JP)

(72) Inventor: Masanari Takaki, Chiryu (JP)

(73) Assignee: DENSO CORPORATION, Kariya (JP)

( * ) Notice: Subject to any disclaimer, the term of this patent is extended or adjusted under 35 U.S.C. 154(b) by 206 days.

(21) Appl. No.: 14/643,072

(22) Filed: Mar. 10, 2015

(65) Prior Publication Data

US 2015/0258936 A1 Sep. 17, 2015

(30) Foreign Application Priority Data

Mar. 12, 2014 (JP) ................. 2014-048892

(51) Int. Cl.
*B60R 1/00* (2006.01)
*G06T 3/40* (2006.01)
*H04N 5/232* (2006.01)

(52) U.S. Cl.
CPC .............. *B60R 1/00* (2013.01); *G06T 3/4038* (2013.01); *H04N 5/23238* (2013.01); *B60R 2300/303* (2013.01); *B60R 2300/607* (2013.01)

(58) Field of Classification Search
CPC ................ B60R 1/00; B60R 2300/607; B60R 2300/105; B60R 2300/303;
(Continued)

(56) References Cited

U.S. PATENT DOCUMENTS 6,911,997 B1 * 6/2005 Okamoto ............. B60R 1/00
348/148
7,139,412 B2 * 11/2006 Kato ..................... B60R 1/00
340/426.23
(Continued)

FOREIGN PATENT DOCUMENTS

EP 2242022 A1 * 10/2010
JP 2004-254219 A 9/2004
(Continued)

OTHER PUBLICATIONS

Machine generated translation of PCT #WO2015/052314 to Schrepfer, Dec. 22, 2016.*
(Continued)

*Primary Examiner* — David Harvey
(74) *Attorney, Agent, or Firm* — Posz Law Group, PLC

(57) ABSTRACT

In a composite image generation apparatus that is mounted in an own vehicle, each of captured images, which have been captured by a plurality of imaging units, are acquired. A disturbance level for each of the plurality of captured images that have been acquired is determined. The disturbance level indicates: whether or not a disturbance is present in the captured image; or an extent of the disturbance. In an overlapping area in which imaging areas of the plurality of captured images overlap, one or more captured images is selected from the plurality of captured images so that the area occupied by a captured image having a higher disturbance level among the plurality captured images is smaller. A composite image is generated based on the plurality of captured images. In the overlapping area, the composite image is generated by using the captured image selected based on the disturbance level.

18 Claims, 9 Drawing Sheets

(58) Field of Classification Search
CPC .......... B60R 2300/30; B60R 2300/802; B60R 2300/8053; H05N 5/23238
USPC .................................................. 348/36, 148
See application file for complete search history.

(56) References Cited

U.S. PATENT DOCUMENTS

| | | | | |
|---|---|---|---|---|
| 7,663,476 B2* | 2/2010 | Watanabe | ............... | B60Q 9/005 340/435 |
| 7,728,879 B2* | 6/2010 | Ishii | ............... | G06T 3/4038 348/148 |
| 8,384,782 B2* | 2/2013 | Hiroshi | ............... | B60R 1/00 340/435 |
| 9,050,931 B2* | 6/2015 | Yamamoto | ............... | G06K 9/00791 |
| 9,253,373 B2* | 2/2016 | Tico | ............... | H04N 5/14 |
| 2002/0047901 A1* | 4/2002 | Nobori | ............... | B60R 1/00 348/149 |
| 2005/0258370 A1* | 11/2005 | Kawamura | ............... | B60R 1/00 250/370.08 |
| 2007/0014347 A1* | 1/2007 | Prechtl | ............... | H04N 5/232 375/240.01 |
| 2007/0153086 A1 | 7/2007 | Usui et al. | | |
| 2009/0009604 A1* | 1/2009 | Kanaoka | ............... | B60R 1/00 348/148 |
| 2010/0013930 A1* | 1/2010 | Matsuo | ............... | B60R 1/00 348/148 |
| 2010/0110234 A1* | 5/2010 | Kaneko | ............... | G06T 11/60 348/241 |
| 2011/0156887 A1* | 6/2011 | Shen | ............... | G06K 9/32 340/425.5 |
| 2011/0234801 A1* | 9/2011 | Yamada | ............... | B60R 1/00 348/148 |
| 2011/0285848 A1* | 11/2011 | Han | ............... | B60R 1/00 348/148 |
| 2011/0317033 A1* | 12/2011 | King | ............... | H04N 5/23238 348/231.99 |
| 2012/0026333 A1* | 2/2012 | Okuyama | ............... | B60R 1/00 348/148 |
| 2012/0069153 A1* | 3/2012 | Mochizuki | ............... | B60R 1/00 348/47 |
| 2012/0105679 A1* | 5/2012 | Osuga | ............... | H04N 5/23238 348/231.99 |
| 2013/0107048 A1* | 5/2013 | Rottner | ............... | H04N 5/23238 348/148 |
| 2013/0208140 A1* | 8/2013 | Quast | ............... | H04N 5/23203 348/229.1 |
| 2013/0235201 A1* | 9/2013 | Kiyohara | ............... | G06K 9/00805 348/148 |
| 2014/0125774 A1* | 5/2014 | Lee | ............... | G06T 3/4038 348/47 |
| 2014/0232869 A1* | 8/2014 | May | ............... | H04N 5/2171 348/148 |
| 2014/0247352 A1* | 9/2014 | Rathi | ............... | B60R 1/00 348/148 |
| 2015/0042806 A1* | 2/2015 | Wierich | ............... | G06T 5/50 348/148 |
| 2015/0103173 A1* | 4/2015 | Takaki | ............... | B60R 11/04 348/148 |
| 2015/0172582 A1* | 6/2015 | Kiyohara | ............... | G06K 9/00791 348/322 |
| 2015/0254825 A1* | 9/2015 | Zhang | ............... | B60R 1/00 382/284 |
| 2015/0324651 A1* | 11/2015 | Fukata | ............... | G06K 9/00825 348/148 |
| 2016/0159281 A1* | 6/2016 | Jang | ............... | B60R 1/06 348/148 |

FOREIGN PATENT DOCUMENTS

| | | |
|---|---|---|
| JP | 2007-166443 A | 6/2007 |
| JP | 2009-141490 A | 6/2009 |
| JP | 2009-278428 A | 11/2009 |
| JP | 2010-165299 A | 7/2010 |
| JP | 2011-049735 A | 3/2011 |
| JP | 2011-223075 A | 11/2011 |
| JP | 2012-134586 A | 7/2012 |
| WO | WO2015/052314 * | 4/2015 |
| WO | WO 2015052314 A1 * | 4/2015 |

OTHER PUBLICATIONS

Machine generated translation of DE #102013220506 to Schrepfer, Dec. 22, 2016.*

* cited by examiner

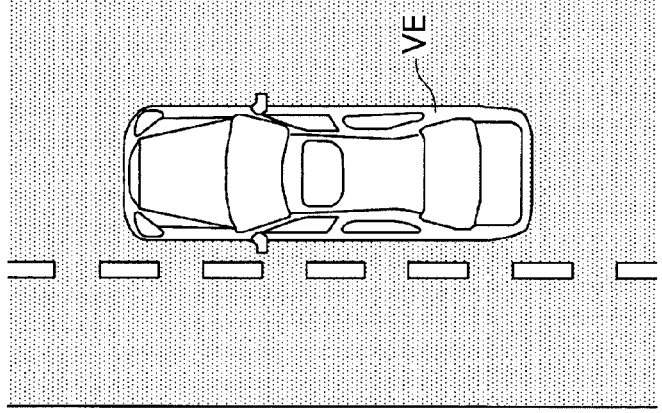
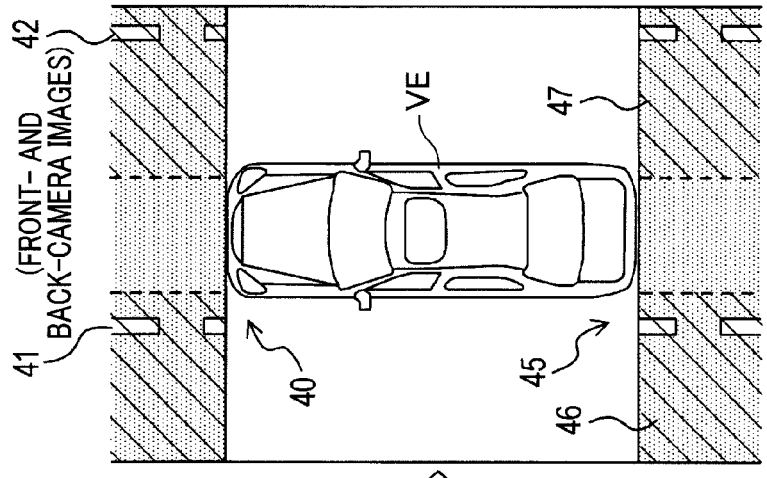
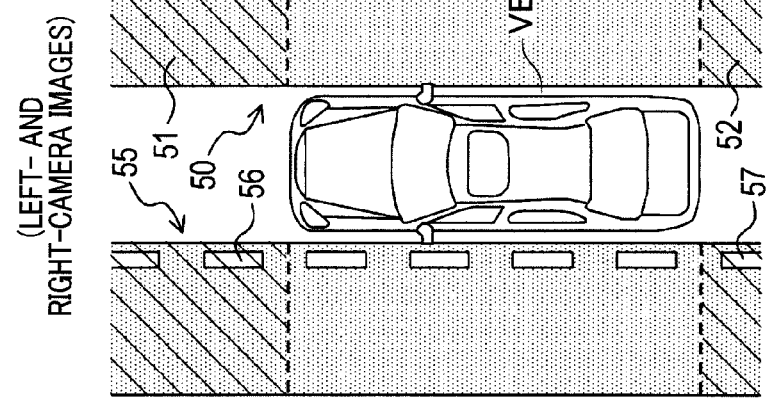

COMPOSITE IMAGE GENERATION APPARATUS AND COMPOSITE IMAGE GENERATION PROGRAM

CROSS-REFERENCE TO RELATED APPLICATION

This application is based on and claims the benefit of priority from Japanese Patent Application No. 2014-048892, filed Mar. 12, 2014, the disclosure of which is incorporated herein in its entirety by reference.

BACKGROUND

Technical Field

The present disclosure relates to a composite image generation apparatus and a composite image generation program for generating a composite image that is a combination of a plurality of images.

Related Art

As the above-described composite image generation apparatus, the following known (for example, refer to JP-A-2012-134586). The composite image generation apparatus acquires captured images of a vehicle periphery. These images have been captured by a plurality of cameras. Based on the captured images, the composite image generation apparatus then generates a bird's-eye view image that is supposed to show a view from directly above the vehicle (own vehicle). In this composite image generation apparatus, when imaging areas of the plurality of captured images overlap, the captured images are cut at sections that have been set in advance. Portions of the overlapping areas are deleted. The images are then joined together, thereby forming a natural-looking bird's-eye view image.

The above-described birds-eye view image (composite image) is used to check the periphery of the own vehicle. However, for example, a strong light may be captured in any of the captured images. In such instances, blocked up shadows (a phenomenon in which an area other than a light source in a captured image becomes black) may be formed in the captured image. The area over which the periphery can be checked using the composite image becomes smaller.

In addition, similar situations occur when dirt, water drops, and the like attach to the camera lens. In such instances, a problem occurs in that it becomes difficult to check the periphery using the composite image.

SUMMARY

It is thus desired to provide a composite image generation apparatus that is mounted in an own vehicle and generates a composite image that is a combination of captured images acquired by a plurality of imaging units, in which a composite image can be generated that facilitates checking of the periphery of the own vehicle.

An exemplary embodiment of the present disclosure provides a composite image generation apparatus that includes captured image acquiring means, disturbance level determining means, captured image selecting means, and image generating means. The captured image acquiring means acquires each of captured images that have been captured by a plurality of imaging units. The disturbance level determining means determines a disturbance level for each of the plurality of captured images that have been acquired. The disturbance level indicates: whether or not a disturbance is present in the captured image; or an extent of the disturbance. The captured image selecting means selects, in an overlapping area in which imaging areas of a plurality of captured images overlap, one or more captured images from the plurality of captured images so that the area occupied by a captured image having a higher disturbance level among the plurality captured images is smaller. The image generating means generates a composite image based on the plurality of captured images, and generates the composite image by using the captured image selected based on the disturbance level in the overlapping area.

In a composite image generation apparatus such as this, the proportion in a composite image occupied by a captured image in which a disturbance has occurred can be reduced based on the presence of a disturbance and the extent of the disturbance. Therefore, a composite image can be generated that facilitates checking of the periphery of an own vehicle.

In the present disclosure, a composite image generation program may be provided that enables a computer to actualize each means configuring the composite image generation apparatus. In addition, the expressions in the claims can be arbitrarily combined to the extent possible. In this case, some configurations may be eliminated to an extent allowing the object of the present disclosure to be achieved.

BRIEF DESCRIPTION OF THE DRAWINGS

In the accompanying drawings:

FIG. 5A to FIG. 5C are bird's-eye views of an example of captured images and overlapping visual field areas;

DESCRIPTION OF EMBODIMENTS

An embodiment of the present disclosure will hereinafter be described with reference to the drawings.

[Configuration]

Figure 1:
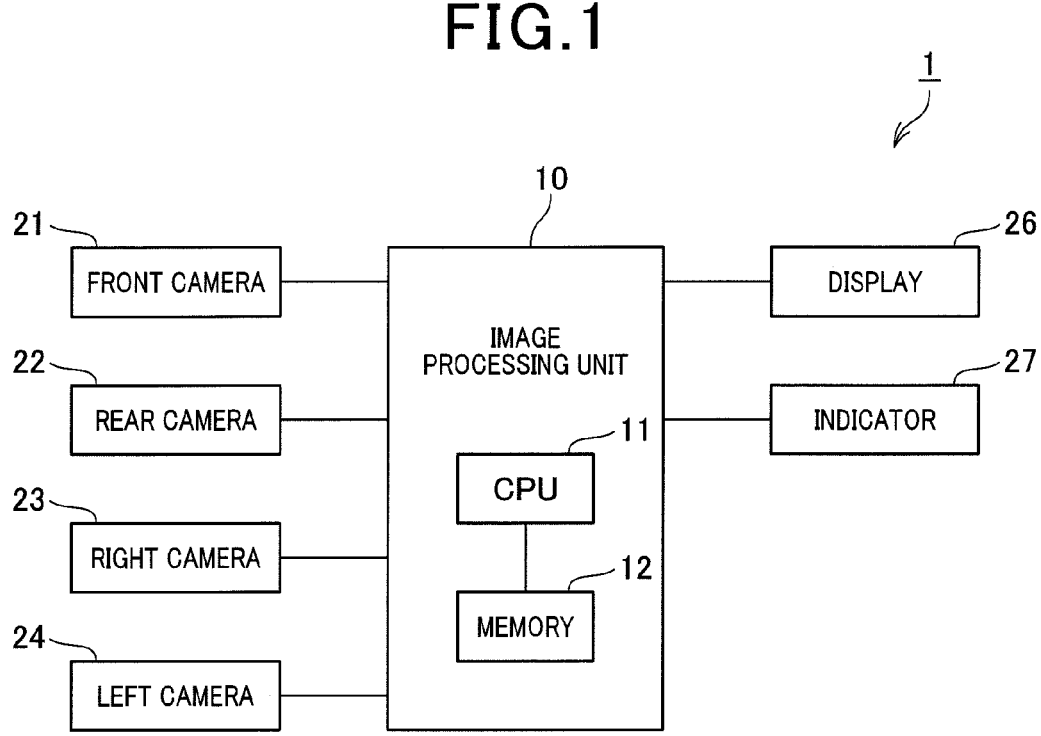
FIG. 1 is a block diagram of an overall configuration of an image display system to which the present disclosure is applied.

The present disclosure is applied to an image display system 1, as shown in FIG. 1. The image display system 1 is mounted in a vehicle, such as a passenger car (also referred to, hereafter, as an own vehicle). The image display system 1 generates a composite image that is a combination of captured images acquired by a plurality of cameras 21 to 24. The image display system 1 recognizes road surface paint, such as white lines, from the generated image.

Figure 2:
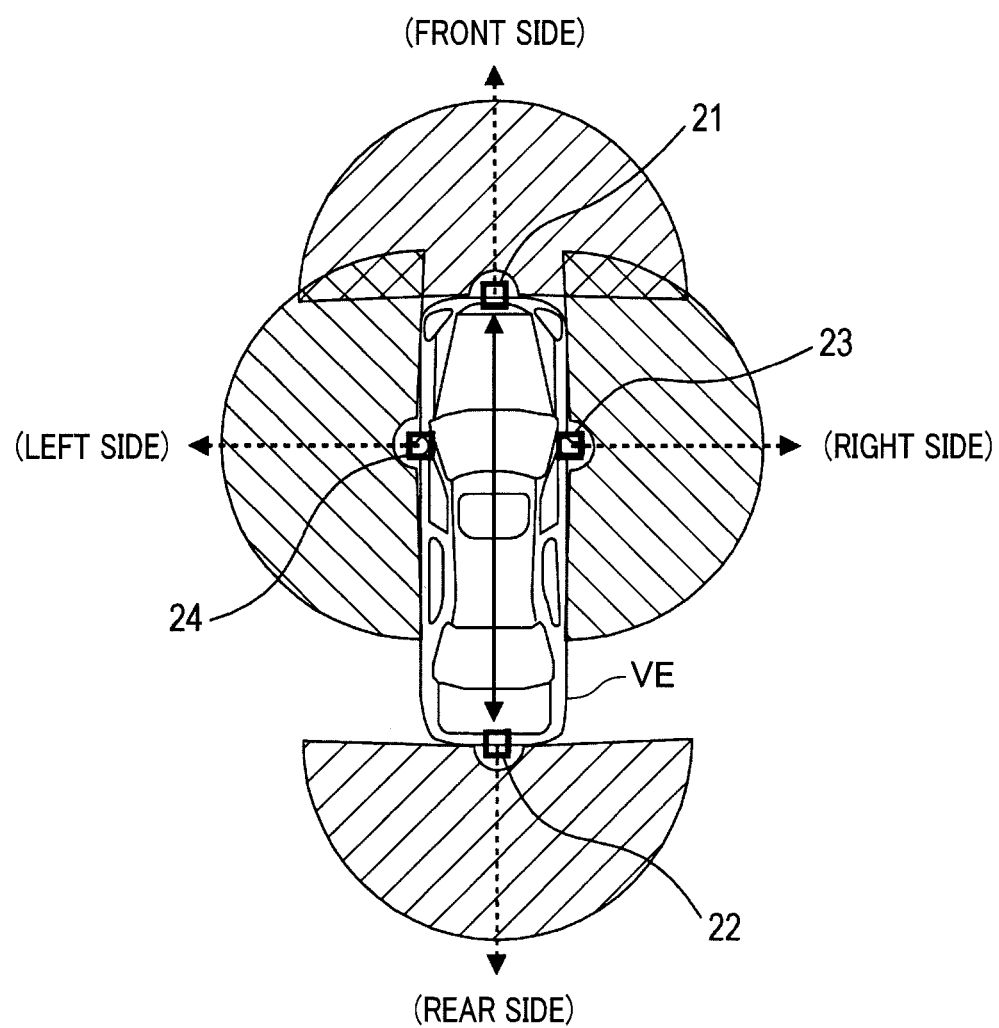
FIG. 2 is a birds-eye view of camera placement positions.

Specifically, as shown in FIG. 1, the image display system 1 includes an image processing unit 10, various cameras 21 to 24, a display 26, and an indicator 27. The various cameras 21 to 24 include a front camera 21, a rear camera 22, a right camera 23, and a left camera 24. The cameras 21 to 24 each have an imaging area, as shown by the shaded portions in FIG. 2 and the like. In FIG. 2 and the like, each imaging area is schematically shown using a fan shape (half circle).

However, the actual imaging area does not necessarily take this shape. The imaging area may be an arbitrary shape and size.

More specifically, the front camera 21 is disposed, for example, in the front bumper. The imaging area of the front camera 21 is the area ahead of the own vehicle VE. The rear camera 22 is disposed, for example, in the rear bumper. The imaging area of the rear camera 22 is the area behind the own vehicle VE.

The right camera 23 is disposed, for example, in the right side mirror of the own vehicle VE. The imaging area of the right camera 23 is the area to the right of the own vehicle VE. The left camera 24 is disposed, for example, in the left side mirror of the own vehicle VE. The imaging area of the left camera 24 is the area to the left of the own vehicle VE. For example, each camera 21 to 24 captures an image every 33 milliseconds (ms). The cameras 21 to 24 then send the captured images to the image processing unit 10.

The display 26 is configured as a known display that displays images based on image signals sent from the image processing unit 10.

The indicator 27 gives visual notification based on a display command from the image processing unit 10. For example, the indicator 27 gives notification regarding the degree of recognition accuracy of road surface paint, such as white lines. The indicator 27 includes, for example, a plurality of light-emitting units. The number of light-emitting units that are lit changes depending on the recognition accuracy. The recognition accuracy of the road surface paint indicates the accuracy of a white-line extraction process (step S135), described hereafter. The image processing unit 10 performs output based on this accuracy.

The image processing unit 10 is configured by a known computer that includes a central processing unit (CPU) 11 and a memory 12, such as a read-only memory (ROM) or a random access memory (RAM). The CPU 11 performs various processes, such as a white-line recognition process, described hereafter, based on programs (including a composite image generation program) stored in the memory 12.

[Processes]

Figure 3:
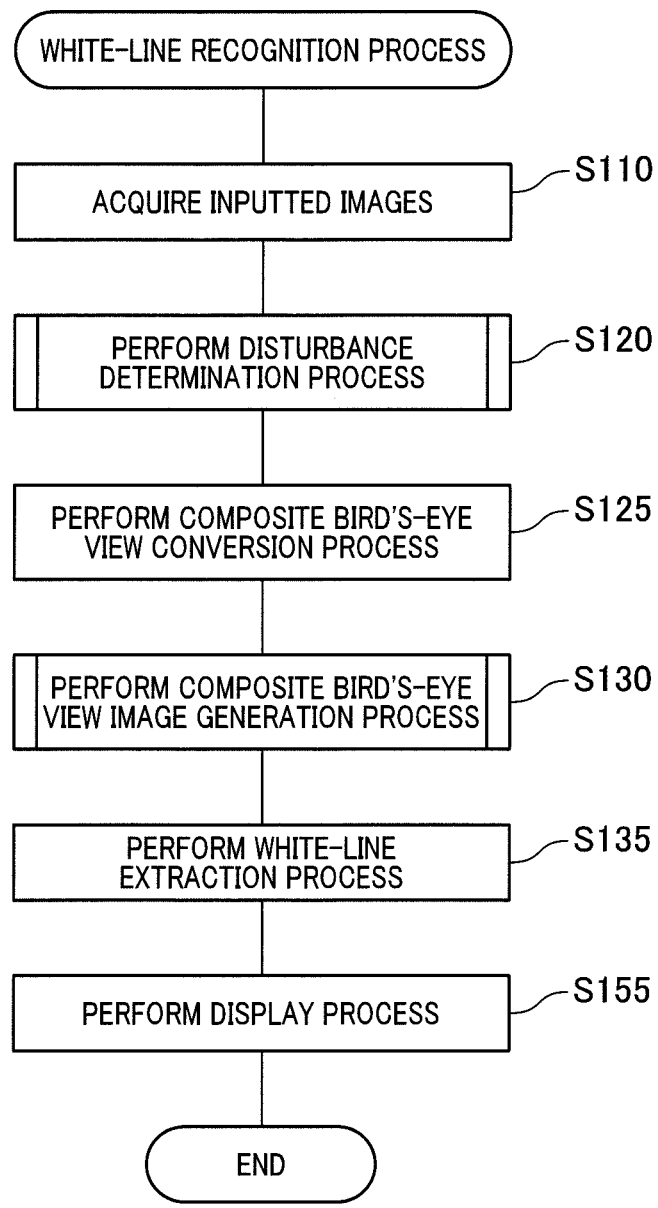
FIG. 3 is a flowchart of a white-line recognition process performed by an image processing unit (CPU)

In the image display system 1 configured as described above, the image processing unit 10 performs the white-line recognition process shown in FIG. 3. The image processing unit 10 starts the white-line recognition process when, for example, the power of the image processing unit 10 is turned ON. The image processing unit 10 then repeatedly performs the white-line recognition process at a fixed interval (such as every 33 milliseconds).

In the white-line recognition process, first, the image processing unit 10 acquires the captured images that have been captured by the plurality of cameras 21 to 24 (step S110). The image processing unit 10 then performs a disturbance determination process (step S120). The disturbance determination process is performed to determine a disturbance level. The disturbance level indicates whether or not a disturbance is present in each captured image, or the extent of the disturbance. Here, the type of disturbance is also determined as a part of the disturbance level.

Figure 4:
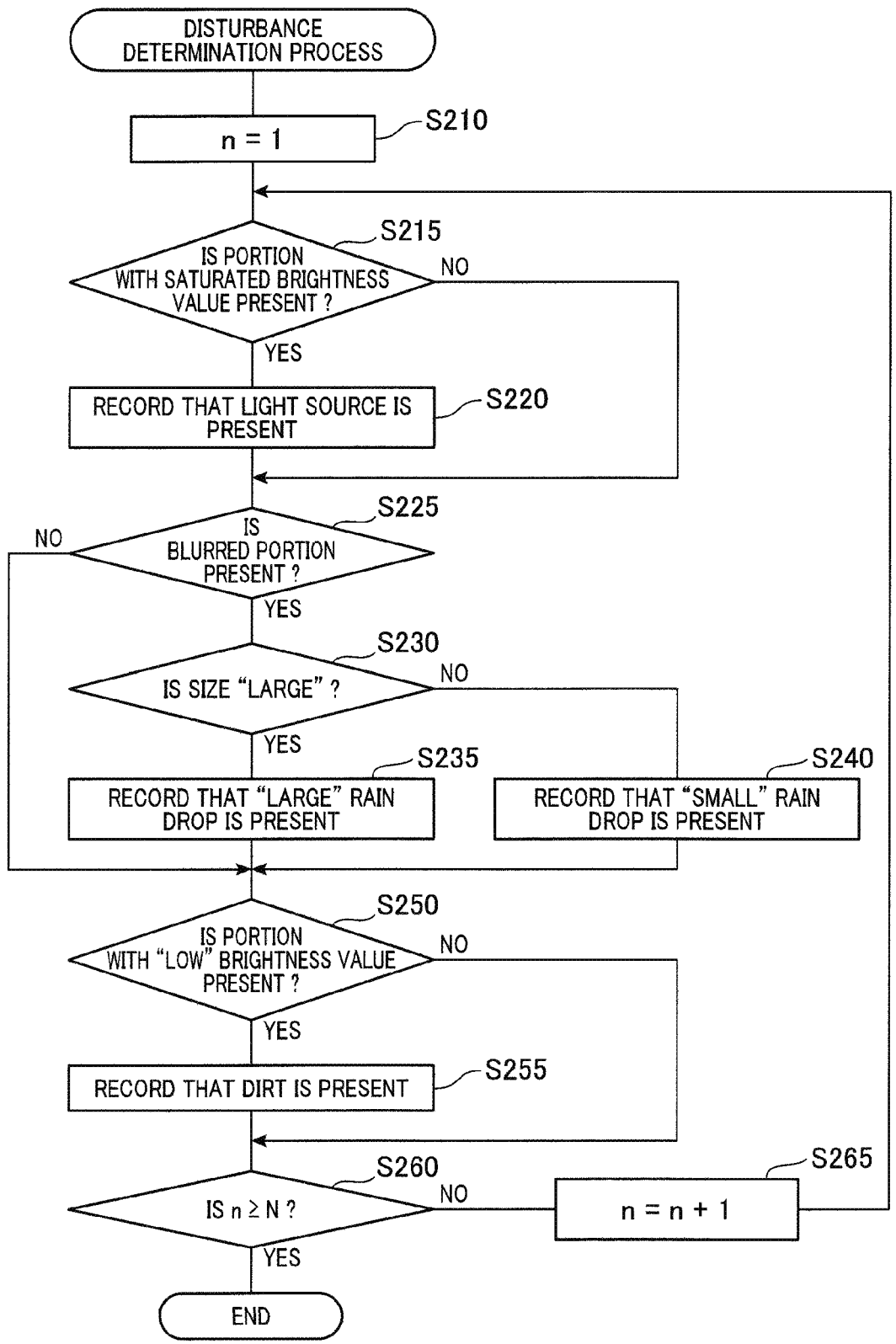
FIG. 4 is a flowchart of a disturbance determination process in the white line recognition process.

In the disturbance determination process, as shown in FIG. 4, first, the image processing unit 10 sets a variable n to 1 (step S210). In other words, the image processing unit 10 selects an n-th captured image. Here, the variable n designates any of the captured images. For example, the variable n is assigned as follows: the captured image by the front camera 21 is n=1; the captured image by the rear camera 22 is n=2; the captured image by the right camera 23 is n=3; and the captured image by the left camera 24 is n=4.

Next, the image processing unit 10 determines whether or not a saturated portion in which a brightness value is saturated is present in the selected n-th image (step S215). In this process, the image processing unit 10 determines the brightness value of each pixel composing the captured image. The image processing unit 10 makes an affirmative determination when the brightness value is saturated (a brightness level of 100% is present).

When determined that a saturated portion in which a brightness value is saturated is not present (NO at step S215), the image processing unit 10 proceeds to the process at step S225, described hereafter. When determined that a saturated portion in which a brightness value is saturated is present (YES at step S215), the image processing unit 10 records, in the memory 12, that a light source is present in this captured image (step S220). The light source, such as the sun or headlights, may adversely affect white-line recognition.

When a light source is present in the captured image in this way, for example, the image processing unit 10 deducts 30 points from an allotted score (such as an initial score of 100 points) of the captured image. The image processing unit 10 then records the score in the memory 12. The number of points deducted is an example. However, the amount of deduction increases for light sources (types of disturbances) presumed to have a greater adverse effect on the recognition of white lines from the captured image.

Next, the image processing unit 10 determines whether or not a blurred portion is present in the captured image (step S225). The blurred portion refers to an area that has a brightness value that is greater than that of "dirt (stains, smudges)", described hereafter. In the blurred portion, the difference in brightness value between adjacent pixels is small. Also, the blurred portion is out of focus.

When determined that a blurred portion is not present in the captured image (NO at step S225), the image processing unit 10 proceeds to the process at step S250, described hereafter. When determined that a blurred portion is present in the captured image (YES at step S225), the image processing unit 10 determines the size of the blurred portion (step S230).

When determined that the size of the blurred portion is a size threshold or greater (YES at step S230), the image processing unit 10 determines that the size of the blurred portion is large. The size threshold is set in advance. The image processing unit 10 then records, in the memory 12, that a large rain drop (water drop) is present in the captured image (step S235). When a large rain drop is present in the captured image in this way, for example, the image processing unit 10 deducts 30 points from the allotted score of the captured image. The image processing unit 10 then records the score in the memory 12.

When determined that the size of the blurred portion is less than the size threshold (NO at step S230), the image processing unit 10 determines that the size of the blurred portion is small. The image processing unit 10 then records, in the memory 12, that a small rain drop is present in the captured image (step S240). When a small rain drop is present in the captured image in this way, for example, the image processing unit 10 deducts only 10 points from the allotted score of the captured image. The amount of deduction in this case is less than that when a light source or a large rain drop is present in the captured image. The image processing unit 10 then records the score in the memory 12.

Next, the image processing unit 10 determines whether or not an area that has a significantly low brightness value in relation to the brightness values of the surrounding pixels is present (step S250). When determined that an area having a significantly low brightness value is not present (NO at step S250), the image processing unit 10 proceeds to the process at S260, described hereafter.

When determined that an area having a significantly low brightness value is present (YES at step S250), the image processing unit 10 records, in the memory 12, that dirt is present in the image. When dirt is present in the captured image in this way, for example, the image processing unit 10 deducts 20 points from the allotted score of the captured image. The image processing unit 10 then records the score in the memory 12 (step S255). The number of points deducted in this case is set to be greater than that when a small rain drop is present in the captured image and less than that when a light source or a large rain drop is present in the captured image.

Next, the image processing unit 10 compares the variable n with the number N of the captured images (step S260). The number N of the captured images is four because four cameras 21 to 24 are present according to the present embodiment. When determined that the variable n is less than the number N of the captured images (NO at step S260), the image processing unit 10 increments the variable n. The image processing unit 10 then returns to the process at step S215. When determined that the variable n is the number N of the captured images or more, the image processing unit 10 ends the disturbance determination process.

Next, the image processing unit 10 returns to the process in FIG. 3. The image processing unit 10 performs a composite birds-eye view conversion process (step S125). A geometric transformation table is provided for converting each of the captured images to a birds-eye view (bird's-eye view image) that is supposed to be viewed from directly above the own vehicle VE. In the composite birds-eye view conversion process, the image processing unit 10 uses the geometric transformation table to perform coordinate conversion on the pixels in the captured images. The image processing unit 10 thereby obtains captured images that have been converted to a bird's-eye view image.

For example, the own vehicle VE is traveling on a road, as shown in FIG. 5A. The images obtained from the cameras 21 to 24 are converted. As a result, the birds-eye view images shown in FIG. 5B and FIG. 5C are obtained. In other words, as shown in FIG. 5B, a front image 40 captured by the front camera 21 is obtained. In addition, a rear image 45 captured by the rear camera 22 is obtained. As shown in FIG. 5C, a right image 50 captured by the right camera 23 is obtained. In addition, a left image 55 captured by the left camera 24 is obtained.

Next, the image processing unit 10 performs a composite bird's-eye view image generation process (step S130). In the composite birds-eye view image generation process, the image processing unit 10 obtains a composite birds-eye view image (composite image) by combining the bird's-eye view images corresponding to the captured images.

Here, it is noted that overlapping visual field areas (overlapping areas) are present in the bird's-eye view images obtained by converting the captured images to bird's-eye view. The overlapping visual field area refers to an area in which the imaging areas of a plurality of captured images overlap. For example, an area 41 of the front image 40 shown in FIG. 5B overlaps with an area 56 of the left image 55 shown in FIG. 5C. The area 41 is further to the left of the own vehicle VE. The area 56 is further ahead of the own vehicle VE.

In addition, in a similar manner, an area 42 of the front image 40 and an area 51 of the right image 50 form an overlapping visual field area. The area 42 is to the right of the own vehicle VE. The area 51 is ahead of the own vehicle VE. An area 46 of the rear image 45 and an area 57 of the left image 55 also form an overlapping visual field area. The area 46 is to the left of the own vehicle VE. The area 57 is behind the own vehicle VE. Furthermore, an area 47 of the rear image 45 and an area 52 of the right image 50 also form an overlapping visual field area. The area 47 is to the right of the own vehicle VE. The areas 52 is behind the own vehicle VE.

Therefore, in the composite birds-eye view image generation process, the image processing unit 10 appropriately selects the image to be used in the overlapping visual field area, taking disturbance into consideration, when generating the composite birds-eye view image.

Figure 6:
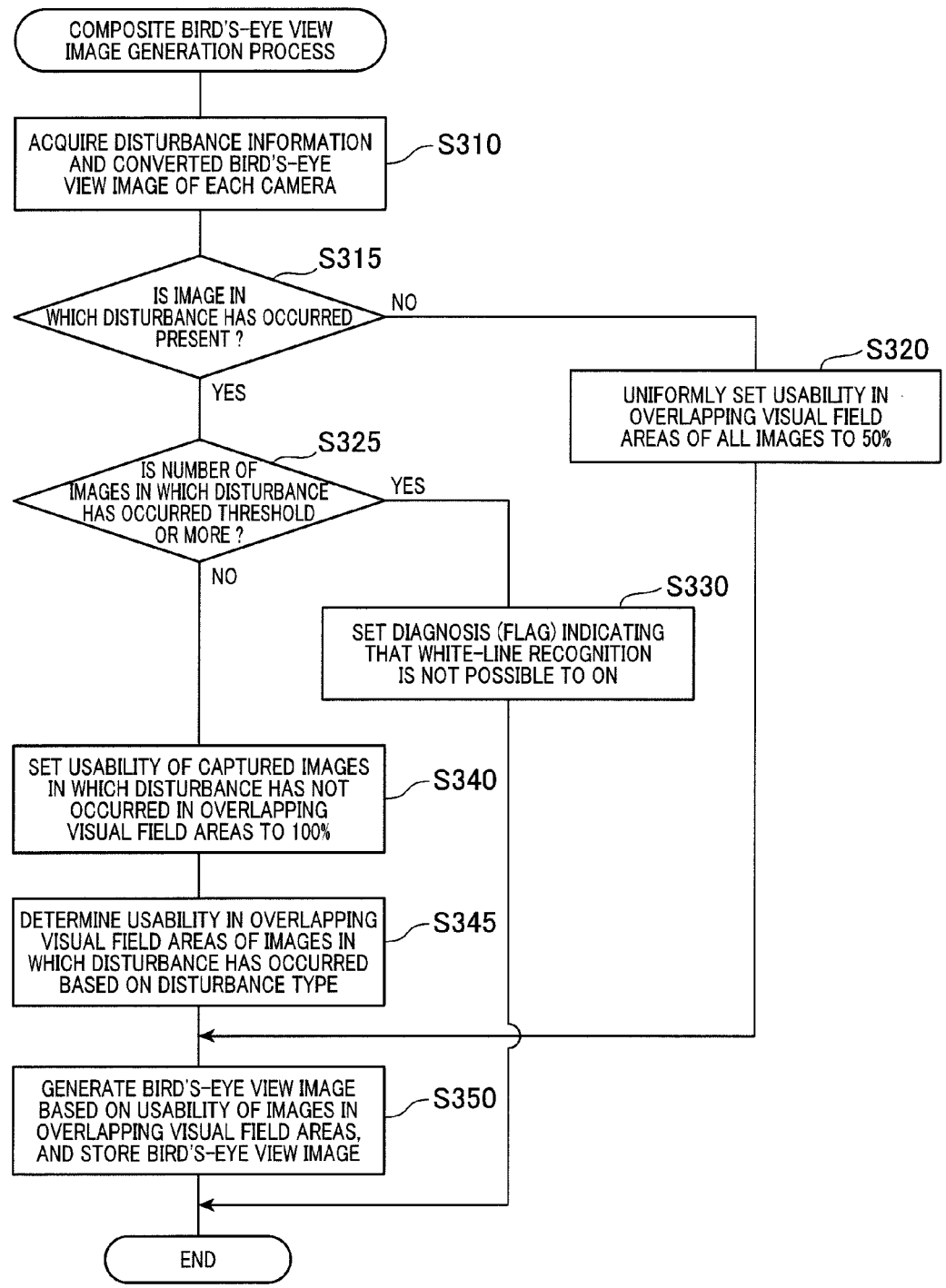
FIG. 6 is a flowchart of a composite birds-eye view generation process in the white-line recognition process.

The details of the composite birds-eye view image generation process are as follows. As shown in FIG. 6, first, the image processing unit 10 acquires disturbance information of the captured images by the cameras 21 to 24 (step S310). Here, the disturbance information refer to the information on the type of disturbance and the score that have been recorded in the memory 12 in the above-described disturbance determination process. In addition, in the composite bird's-eye view image generation process, the image processing unit 10 also acquires the birds-eye view image of each captured image (the front image 40, the rear image 45, the right image 50, and the left image 55).

Next, the image processing unit 10 determines whether or not a captured image is present in which a disturbance has occurred (step S315). Here, the disturbance refers to any of the light sources, rain drops, dirt, and the like that have been determined in the disturbance determination process. The image processing unit 10 determines that a disturbance has occurred if even one of these disturbances is present.

Figure 7:
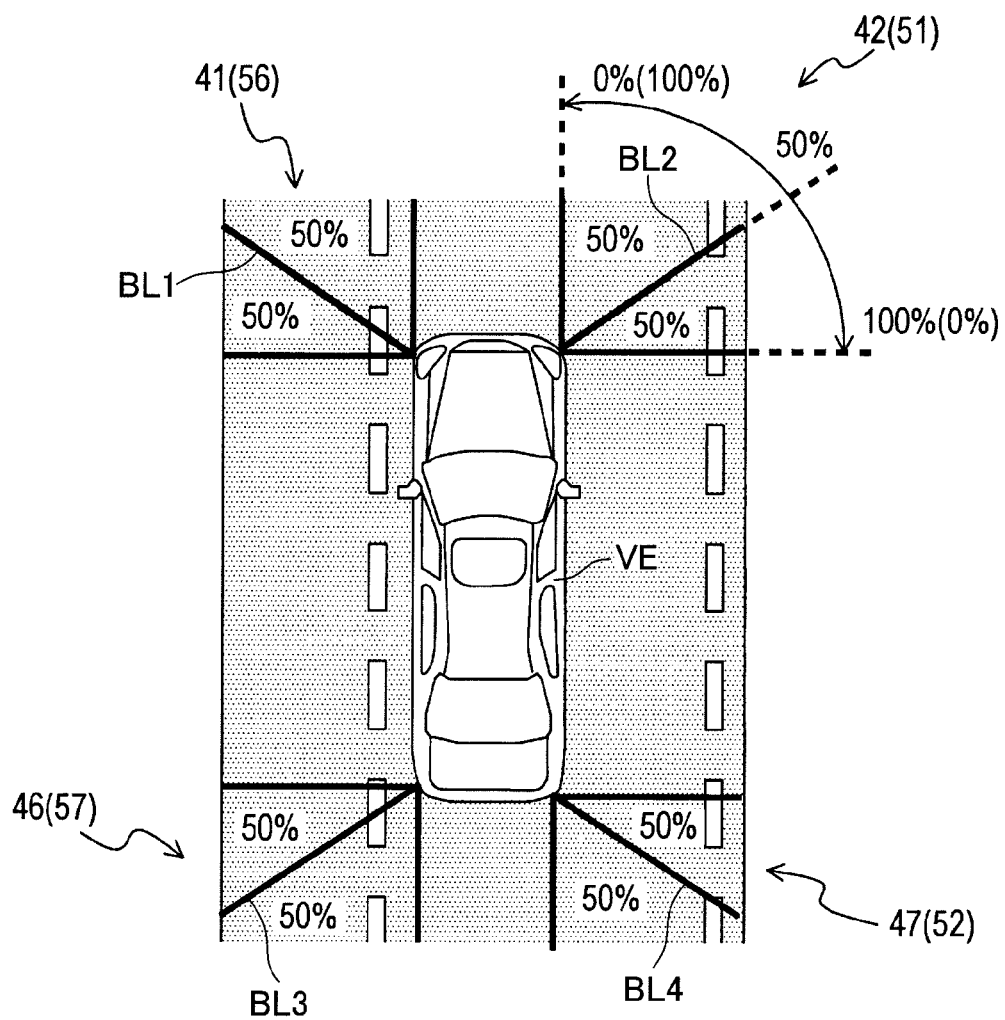
FIG. 7 is a birds-eye view showing an example of a composite birds-eye view image (1)

When determined that a captured image in which a disturbance has occurred is not present (NO at step S315), the image processing unit 10 uniformly sets the usability (usage rate) in the overlapping visual field areas of all images to a uniform 50% (step S320). In other words, as shown in FIG. 7, boundary lines BL1 to BL 4 are drawn in the bird's-eye view of the own vehicle VE. The boundary lines BL1 to BL 4 are at a 45-degree angle to the advancing direction of the own vehicle VE, with the four corners of the own vehicle VE serving as the respective axes.

Then, the image processing unit 10 changes the images to be used, using the boundary lines BL1 to BL 4 as the boundaries. For example, in the overlapping visual field area (42 and 51) to the front-right of the own vehicle VE, the front image 40 is used for the area further to the front side of the own vehicle VE from the boundary line BL2. The right image 50 is used for the area further to the right side of the own vehicle VE from the boundary line BL2.

In addition, the boundary line BL1 to BL 4 can be changed to an arbitrary angle. For example, as shown in FIG. 7, in the overlapping visual field area (42 and 51), the usability of the front image 40 becomes 0% when the boundary line BL2 is set to be parallel with the advancing direction of the own vehicle VE. The usability of the right image 50 becomes 100%. As still another example, in the overlapping visual field area (42 and 51), the usability of the front image 40 becomes 100% when the boundary line is set to be perpendicular to the advancing direction of the own vehicle VE. The usability of the right image 50 becomes 0%.

When the process at step S320, such as that described above, completed, the image processing unit 10 proceeds to the process at step S350, described hereafter. When determined that an image in which a disturbance has occurred is present in the process at step S315 (YES at step S315), the image processing unit 10 compares the number of images in which a disturbance has occurred with a threshold of the number of images that is set in advance (step S325). The threshold of the number of images can be arbitrarily set based on an application or the like used to perform the white-line recognition.

When determined that the number of images in which a disturbance has occurred is the threshold of the number of images or more (YES at step S325), the image processing unit 10 sets a diagnosis (flag), indicating that white-line recognition is not possible, to ON (step S330). The image processing unit 10 then ends the composite bird's-eye view image generation process.

When determined that the number of images in which a disturbance has occurred is less than the threshold of the number of images (NO at step S325), the image processing unit 10 sets the usability of the images in which a disturbance has not occurred in the overlapping visual field areas to 100% (step S340).

Figure 8A:
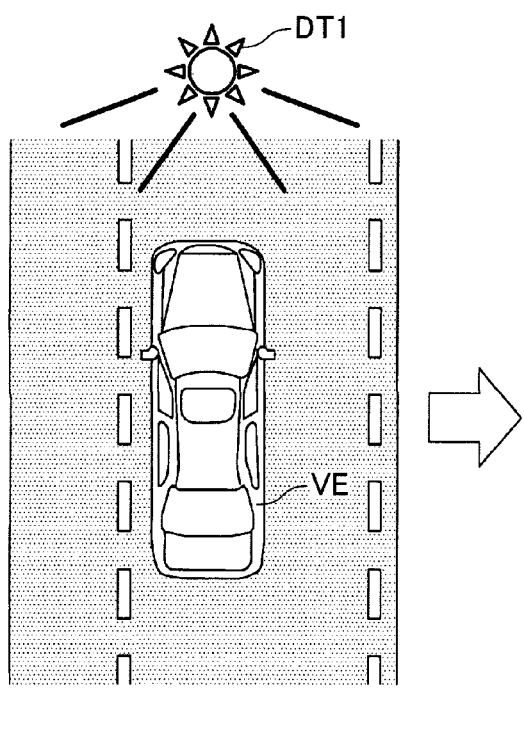
FIG. 8A and FIG. 8B are birds-eye views showing an example of a composite birds-eye view image (2)
Figure 8B:
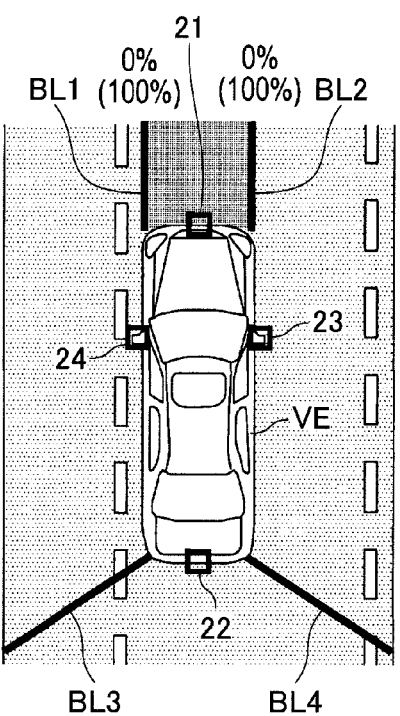

For example, as shown in FIG. 8A, when a light source DT1 is present in the front image 40 and disturbances are not present in the remaining images, as shown in FIG. 8B, the image processing unit 10 sets the usability of the front image 40 in the overlapping visual field area to 0%. The image processing unit 10 sets the usability of the right image 50 and the left image 55 on the front side to 100%. Regarding the overlapping visual field areas of the rear image 45 with the right image 50 and the left image 55, the image processing unit 10 sets the usability to 50%.

Next, the image processing unit 10 sets the usability in the overlapping visual field areas of images in which disturbances have occurred, based on the type of disturbance (step S345). According to the present embodiment, the usability is set to 0% for images in which a disturbance is present that has a greater effect (disturbance level) on white-line recognition (also called white-line detection).

Figure 9A:
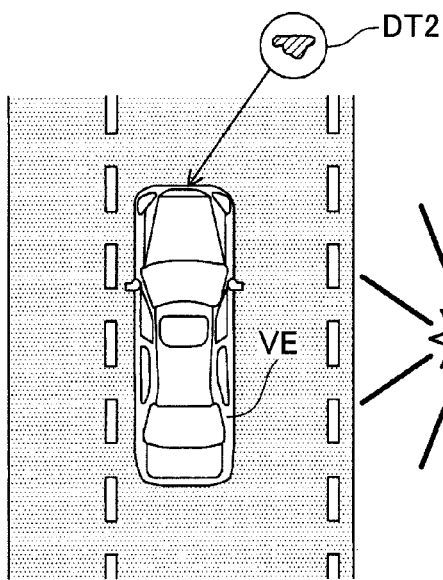
FIG. 9A and FIG. 9B are birds-eye views showing an example of a composite birds-eye view image (3).
Figure 9B:
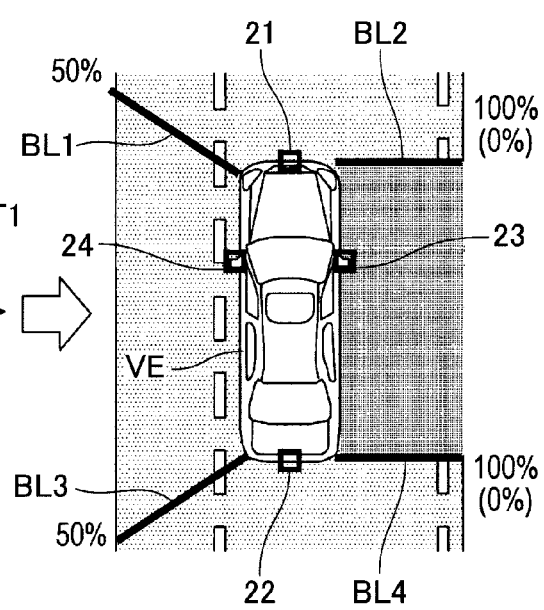

In addition, the image processing unit 10 has set the score based on the type of disturbance in the above-described process. Therefore, in the present process, the image processing unit 10 uses this score to set the usability. For example, as shown in FIG. 9A, when dirt DT2 is present in the front image 40 (−20 points) and a light source DT1 is present in the right image 50 (−30 points), as shown in FIG. 9B, the image processing unit 10 sets the usability of the right image 50 to 0%, the right image 50 being the image with the lower score.

Next, the image processing unit 10 generates the birds-eye view image (composite birds-eye view image) based on the usability set for each overlapping visual field area. The image processing unit 10 then stores the bird's-eye view image in the memory 12 (step S250). When a process such as this is completed, the image processing unit 10 ends the composite birds-eye view image generation process.

Next, the image processing unit 10 returns to the process shown in FIG. 3. The image processing unit 10 performs a white-line extraction process (step S135). This process is omitted when the diagnosis (flag), indicating that white-line recognition is not possible, is set to ON. In addition, when this process is performed, the image processing unit 10 performs a known Hough transform or the like on the bird's-eye view image recorded in the memory 12. The image processing unit 10 then records the white-line recognition result and accuracy (reliability level) in the memory 12. Here, the accuracy of the recognition result is determined based on the number of edges (a portion in which the difference in brightness value is a predetermined amount or more between adjacent pixels), the alignment and regularity of the edges, the difference between the edges and a reference road width that is set in advance, and the like.

Next, the image processing unit 10 performs a display process (step S155). In the display process, the image processing unit 10 generates a signal to perform display based on the white-line recognition result (e.g., coordinate) and the accuracy thereof. The image processing unit 10 then transmits the signal to the display 26 and the indicator 27.

When a process such as this is completed, the image processing unit 10 ends the white-line recognition process.

[Effects]

In the image display system 1 described in detail above, the image processing unit 10 acquires each of the captured images that have been captured by the plurality of cameras 21 to 24. The image processing unit 10 determines a disturbance level for each of the plurality of captured images that have been acquired. The disturbance level indicates whether or not a disturbance is present in the captured image, or the extent of the disturbance.

In addition, regarding an overlapping area in which the imaging areas of a plurality of captured images overlap, the image processing unit 10 selects one or more captured images from the plurality of captured images. The image processing unit 10 makes the selection so that the area occupied by a captured image having a higher disturbance level among the plurality captured images is smaller. The image processing unit 10 then generates a composite image based on the plurality of captured images. The image processing unit 10 generates the composite image using the captured image selected based on the disturbance level in the overlapping area.

In the image display system 1 such as this, the proportion occupied by an image in which a disturbance has occurred can be reduced based on the presence of the disturbance and the extent of the disturbance. Therefore, a composite image can be generated that facilitates checking of the periphery of the own vehicle VE.

In addition, in the above-described image display system 1, the image processing unit 10 determines the type of disturbance as at least a part of the disturbance level. The image processing unit 10 makes the determination based on the brightness value of each pixel composing the captured image. The image processing unit 10 selects the captured image to be used in an overlapping area based on the disturbance level (type of disturbance).

In the image display system 1 such as this, the type of disturbance is determined. Therefore, the captured image to be displayed in the overlapping area can be more appropriately selected based on the type of disturbance.

Furthermore, in the above-described image display system 1, the image processing unit 10 selects a captured image that has the lowest disturbance level in the overlapping area.

In the image display system 1 such as this, the captured image that has the lowest disturbance level is selected. Therefore, the image having the highest reliability can be displayed in the overlapping area.

Moreover, in the above-described image display system 1, the image processing unit 10 generates, as the composite image, a bird's-eye view image that is supposed to be viewed from directly above the own vehicle VE.

In the image display system 1 such as this, a birds-eye view image can be provided. Therefore, a process that takes distortion into consideration can be omitted when the road surface paint is extracted. Therefore, the process for extracting road surface paint from a composite image can be simplified.

In addition, in the above-described image display system 1, the image processing unit 10 extracts the road surface paint from the composite image.

In the image display system 1 such as this, the road surface paint is extracted from the composite image that has been obtained by the above-described configuration. Therefore, the road surface paint can be accurately extracted.

Furthermore, in the above-described image display system 1, the image processing unit 10 calculates the proportion of captured images in which a disturbance has occurred, among the plurality of captured images. The image processing unit 10 performs the calculation based on the disturbance levels. When determined that the proportion is a threshold or higher, the image processing unit 10 prohibits the operation for extracting road surface paint. The threshold used here is set in advance.

In the image display system 1 such as this, when the proportion of captured images in which a disturbance has occurred, among the plurality of captured images, is the pre-set threshold or more, the operation for extracting the road surface paint is prohibited. Therefore, malfunctions caused by erroneous detection of road surface paint can be suppressed.

Other Embodiments

The interpretation of the present disclosure is not limited in any way by the above-described embodiment. In addition, the embodiments of the present disclosure include an aspect in which a part of the configuration according to the above-described embodiment is omitted to an extent that allows the problems to be solved. Furthermore, the embodiments of the present disclosure include an aspect in which the above-described plurality of embodiments are combined as appropriate.

Moreover, the embodiments of the present disclosure include all aspects conceivable without departing from the essence of the present disclosure specified only by the expressions in the scope of claims. In addition, the reference numbers used in the description of the above-described embodiment are also used as appropriate in the scope of claims. However, the reference numbers are used to facilitate understanding of the present disclosure according to each claim, and are not intended to limit the technical scope of the present disclosure according to each claim.

For example, in the process at S345 according to the above-described embodiment, the usability of the image that has the higher disturbance level in the overlapping visual field area is set to 0%. However, an occupancy ratio of each captured image in the overlapping area may be set based on a ratio of the numeric values of the disturbance levels. For example, as shown in FIG. 9A, dirt is present in the front image 40 (−20 points). A light source is present in the right image 50 (−30 points). Therefore, the score of the front image 40 is 80 points. The score of the right image 50 is 70 points. Thus, the usability of the front image 40 can be set to 53.3% and the usability of the right image 50 can be set to 46.7%.

In the image display system such as this, the occupancy ratio in of each captured image the overlapping area can be set based on the ratio of the numeric values of the disturbance levels. Therefore, a highly reliable image that covers a wider area can be displayed.

[Correspondence Relationship]

The image processing unit 10 according to the above-described embodiment corresponds to composite image generation apparatus of the present disclosure. In addition, among the processes performed by the image processing unit 10 according to the above-described embodiment, the process at step S110 corresponds to captured image acquiring means of the present disclosure. The process performed at step S120 according to the above-described embodiment corresponds to disturbance level determining means of the present disclosure.

Furthermore, the processes at S340 and S345 according to the above-described embodiment correspond to captured image selecting means of the present disclosure. The process at S350 according to the above-described embodiment corresponds to image generating means of the present disclosure. In addition, the process at S135 according to the above-described embodiment corresponds to road surface paint extracting means of the present disclosure. The process at S325 according to the above-described embodiment corresponds to disturbance proportion calculating means of the present disclosure.

Furthermore, the process at S330 according to the above-described embodiment corresponds to prohibiting means of the present disclosure.

What is claimed is:

1. A composite image generation apparatus that is mounted in an own vehicle and generates a composite image which is a combination of captured images acquired by a plurality of imaging units, the composite image generation apparatus comprising:
a processor configured to
acquire each of captured images that have been captured by the plurality of imaging units;
determine a disturbance level for each of the plurality of captured images that have been acquired, the disturbance level indicating an extent of a disturbance;
select, in an overlapping area in which imaging areas of the plurality of captured images overlap, one or more captured images from the plurality of captured images so that the area occupied by a captured image having a higher disturbance level among the plurality captured images is smaller; and
generate a composite image based on the plurality of captured images, and generate the composite image by using the captured image selected based on the disturbance level in the overlapping area, wherein
the processor is configured to deduct a number of points from an allotted score corresponding to each of the plurality of captured images in response to the disturbance level.

2. The composite image generation apparatus according to claim 1, wherein
the processor is configured to
determine the type of disturbance as at least a part of the disturbance level based on a brightness value of each pixel composing each of the captured images; and
select one or more captured images from the plurality of captured images based on the disturbance level.

3. The composite image generation apparatus according to claim 2, wherein
the processor is configured to select one or more captured images that has the lowest disturbance level.

4. The composite image generation apparatus according to claim 3, wherein
the processor is configured to:
determine the disturbance level expressed by numeric values; and set an occupancy ratio of each of the captured images in the overlapping area based on a ratio of the disturbance level expressed by numeric values of each of the captured images.

5. The composite image generation apparatus according to claim 4, wherein
the processor is configured to generate, as the composite image, a bird's-eye view image that is supposed to be viewed from directly above the own vehicle.

6. The composite image generation apparatus according to claim 5, wherein
the processor is further configured to extract a road surface paint from the composite image.

7. The composite image generation apparatus according to claim 6, wherein
the processor is further configured to
calculate, based on the disturbance level, a proportion of captured images in which a disturbance has occurred, among the plurality of captured images; and
prohibit an operation of the processor that extracts road surface paint when determined that the proportion is a threshold or higher.

8. The composite image generation apparatus according to claim 1, wherein
the processor is configured to select one or more captured images that has the lowest disturbance level.

9. The composite image generation apparatus according to claim 1, wherein
the processor is configured to
determine the disturbance level expressed by numeric values; and
set an occupancy ratio of each of the captured images in the overlapping area based on a ratio of the disturbance level expressed by numeric values of each of the captured images.

10. The composite image generation apparatus according to claim 1, wherein
the processor is configured to generate, as the composite image, a bird's-eye view image that is supposed to be viewed from directly above the own vehicle.

11. A composite image generation apparatus that is mounted in an own vehicle and generates a composite image which is a combination of captured images acquired by a plurality of imaging units, the composite image generation apparatus comprising:
a processor configured to
acquire each of captured images that have been captured by the plurality of imaging units;
determine a disturbance level for each of the plurality of captured images that have been acquired, the disturbance level indicating an extent of a disturbance;
select, in an overlapping area in which imaging areas of the plurality of captured images overlap, one or more captured images from the plurality of captured images so that the area occupied by a captured image having a higher disturbance level among the plurality captured images is smaller; and
generate a composite image based on the plurality of captured images, and generate the composite image by using the captured image selected based on the disturbance level in the overlapping area, wherein
the processor is further configured to extract a road surface paint from the composite image, and
the processor is further configured to
calculate, based on the disturbance level, a proportion of captured images in which a disturbance has occurred, among the plurality of captured images; and
prohibit an operation of the processor that extracts road surface paint when determined that the proportion is a threshold or higher.

12. An image display system comprising:
a plurality of imaging units that is mounted in an own vehicle and acquires captured images;
a composite image generation apparatus that is mounted in the own vehicle and generates a composite image which is a combination of captured images acquired by the plurality of imaging units; and
a display that is mounted in the own vehicle and displays the composite image generated by the composite image generation apparatus,
the composite image generation apparatus comprising
a processor configured to
acquire each of captured images that have been captured by the plurality of imaging units;
determine a disturbance level for each of the plurality of captured images that have been acquired, the disturbance level indicating an extent of a disturbance;
select, in an overlapping area in which imaging areas of the plurality of captured images overlap, one or more captured images from the plurality of captured images so that the area occupied by a captured image having a higher disturbance level among the plurality captured images is smaller; and
generate a composite image based on the plurality of captured images, and generate the composite image by using the captured image selected based on the disturbance level in the overlapping area, wherein
the processor is configured to deduct a number of points from an allotted score corresponding to each of the plurality of captured images in response to the disturbance level.

13. The image display system according to claim 12, wherein the plurality of imaging units are a plurality of cameras mounted to the own vehicle.

14. The image display system according to claim 12, wherein the processor of the composite image generating apparatus determines the disturbance level for each of the plurality of captured images by determining a brightness value of each pixel that composes each of the plurality of captured images.

15. The image display system according to claim 14, wherein the processor of the composite image generating apparatus determines a type of disturbance based on the brightness value of each pixel that composes each of the plurality of captured images.

16. The image display system according to claim 14, wherein the processor determines whether the brightness value is saturated.

17. The image display system according to claim 2, wherein the processor determines whether the brightness value is saturated.

18. A composite image generation apparatus that is mounted in an own vehicle and generates a composite image which is a combination of captured images acquired by a plurality of imaging units, the composite image generation apparatus comprising:
a processor configured to
acquire each of captured images that have been captured by the plurality of imaging units;
determine a disturbance level for each of the plurality of captured images that have been acquired, the disturbance level indicating an extent of a disturbance;

select, in an overlapping area in which imaging areas of the plurality of captured images overlap, one or more captured images from the plurality of captured images so that the area occupied by a captured image having a higher disturbance level among the plurality captured images is smaller; and generate a composite image based on the plurality of captured images, and generate the composite image by using the captured image selected based on the disturbance level in the overlapping area, wherein the processor is further configured to determine the type of disturbance as at least a part of the disturbance level based on a brightness value of each pixel composing each of the captured images; and select one or more captured images from the plurality of captured images based on the disturbance level, and the processor is further configured to select one or more captured images that has the lowest disturbance level, the processor is further configured to determine the disturbance level expressed by numeric values; and set an occupancy ratio of each of the captured images in the overlapping area based on a ratio of the disturbance level expressed by numeric values of each of the captured images, the processor is further configured to generate, as the composite image, a bird's-eye view image that is supposed to be viewed from directly above the own vehicle, the processor is further configured to extract a road surface paint from the composite image, and the processor is further configured to calculate, based on the disturbance level, a proportion of captured images in which a disturbance has occurred, among the plurality of captured images; and prohibit an operation of the processor that extracts road surface paint when determined that the proportion is a threshold or higher.

\* \* \* \* \*